United States Patent
Bruno et al.

(10) Patent No.: US 7,061,906 B2
(45) Date of Patent: Jun. 13, 2006

(54) METHOD AND APPARATUS FOR A REMOTE SIGNALING AND CALL PROCESSING IN A TELECOMMUNICATIONS NETWORK

(75) Inventors: Richard J. Bruno, Belle Mead, NJ (US); Nicholas D. De Trana, Addison, IL (US); Craig L. DeCaluwe, Naperville, IL (US); Hossein Eslambolchi, Basking Ridge, NJ (US); James J. Gallagher, Lebanon, NJ (US); Paul Greendyk, Prospect Park, NJ (US); Patricia Klink, Sparta, NJ (US); Lockhart M. Clayton, Red Bank, NJ (US); Gary A. Martyn, LaSalle, IL (US)

(73) Assignee: AT & T Corp., Bedminster, NJ (US)

( * ) Notice: Subject to any disclaimer, the term of this patent is extended or adjusted under 35 U.S.C. 154(b) by 1030 days.

(21) Appl. No.: 10/058,031

(22) Filed: Jan. 29, 2002

(65) Prior Publication Data
US 2002/0075855 A1  Jun. 20, 2002

Related U.S. Application Data

(62) Division of application No. 09/075,546, filed on May 11, 1998, now abandoned.

(51) Int. Cl.
*H04L 12/66* (2006.01)
*H04L 12/28* (2006.01)
*G06F 9/46* (2006.01)

(52) U.S. Cl. .................. 370/352; 370/395.2; 718/105
(58) Field of Classification Search .................. None
See application file for complete search history.

(56) References Cited

U.S. PATENT DOCUMENTS

| | | | |
|---|---|---|---|
| 4,748,658 A | 5/1988 | Gopal et al. | |
| 5,553,130 A | 9/1996 | Turner | |
| 5,592,530 A * | 1/1997 | Brockman et al. | 370/252 |
| 5,664,102 A | 9/1997 | Faynberg | |
| 5,710,769 A | 1/1998 | Anderson et al. | |
| 5,828,978 A | 10/1998 | Anand et al. | |
| 5,848,053 A | 12/1998 | Ardon | |
| 5,848,128 A | 12/1998 | Frey | |
| 5,933,474 A | 8/1999 | Kipp | |
| 5,940,491 A | 8/1999 | Anderson et al. | |
| 6,041,117 A | 3/2000 | Androski et al. | |
| 6,154,467 A * | 11/2000 | Hager et al. | 370/522 |

FOREIGN PATENT DOCUMENTS

| | | |
|---|---|---|
| EP | 0 451 400 A | 10/1991 |
| WO | WO 95 31057 A | 11/1995 |
| WO | WO 97 48234 A | 12/1998 |

OTHER PUBLICATIONS

Information Network Handbook, edited by the Institute of Electronics, Information and Communication Engineers, Ohmsha, Ltd., Oct. 1, 1992, pp. 62-64.

* cited by examiner

*Primary Examiner*—Steven Nguyen

(57) ABSTRACT

Telecommunications switching systems that require real-time computer control can be controlled using remotely located computers coupled to the switching systems via data links. By coupling several switching systems to one or more centrally located control computers, maintenance staffing can be reduced while increasing overall system reliability by providing back up control computers in multiple centralized locations. Centrally located control computers can be backed up with redundant computers at the central control site.

6 Claims, 2 Drawing Sheets

METHOD AND APPARATUS FOR A REMOTE SIGNALING AND CALL PROCESSING IN A TELECOMMUNICATIONS NETWORK

BACKGROUND OF THE INVENTION

This divisional application claims priority to U.S. patent application Ser. No. 09/075,546 filed May 11, 1998 now abandoned. The entire disclosure of patent application Ser. No. 09/075,546 is incorporated herein by reference.

This invention relates to communication switching networks. This invention could also relate to other computer controlled networks or control systems such as process controls that might be used in a refinery, banking or other networks handling large amount of data or voice information.

Switching systems networks route thousands of calls, but generally require relatively little computational capability compared to the computational capabilities that are in now-commonly available microprocessors. One critical aspect of switching system reliability however is the control computer(s) that handles routing and switching of calls through the switching system. The typical control architecture in use today is a computer, co-located with the actual switching system. If the controlling computer fails, an entire switching system will be unable to process calls.

The recent advance of inexpensive, high-power microprocessors and the recent advent of high-speed data links now make it possible to locate high-powered computational capabilities at remote locations. Relatively inexpensive microprocessors can provide significant computer power. With the advent of fiber optic cable, for example, it is now possible to remotely provide substantial computer resources to remote locations.

A problem with prior art switching system architectures is the possibility of failure of a computer controlling a switching system to fail. If such a computer does fail, either by natural disaster, an act of terrorism, hardware failure or software failure, neither the Another problem with prior art switching system control systems is the expense associated with maintenance. In communication networks comprised of numerous switching systems, continuous system availability requires that each system have a competent maintenance staff, which is unnecessary most of the time.

A method and an apparatus by which computers controlling a switching system can be centrally located, backed up, and where maintenance staff can also be centrally located would reduce the costs required to provide reliable computer resources for controlling switching systems. Maintenance staff could be reduced while improving system reliability. Instead of using costly, special purpose, highly reliable, fault-tolerant computers, less costly computers could be used without sacrificing network availability because control computer reliability can be achieved with several less expensive computers at several backup locations.

SUMMARY OF THE INVENTION

There is provided herein, a method and an apparatus for centrally locating computers used to control telecommunications switching systems.

A network of switching systems is comprised of switching hardware and a control computer. In these systems, the call processing control can be performed by a central computer coupled to the switching system through an appropriate data link between the centrally located control computer and the switching system.

Call processing message traffic that is exchanged between a co-located computer and the switching system circuitry is coupled to a data link. The data link is coupled to a suitably programmed centrally located control computer such that the centrally located control computer exchanges the call processing data with the switching system through the data link. The remotely located control computer can effectively carry out all call processing functions for the switching system.

In the preferred embodiment, most call processing data is available via a separate signaling network such as AT&T's SS7 network that couples multiple switching systems together and which is connected directly to the centrally located control computer. In-band signaling data such as dual tone multi-frequency (DTMF) signals, and/or dial pulses, which originate in the switching network needs to be sent to the centrally located computers. In-band signaling data uses the data link that connects the remote control computer to the switching systems.

Redundant backup computer capability can be co-located to the centrally located control computer or at a different location. Several communication systems can be controlled from a single location by appropriate data links between the systems and the centrally located control computer.

DETAILED DESCRIPTION OF THE PREFERRED EMBODIMENT

The detailed description of the invention disclosed in the U.S. patent application Ser. No. 08/808,298 for a "Distributed Network Control and Fabric Application Interface" filed Feb. 28, 1997 and assigned to AT&T is hereby incorporated by reference. A method and apparatus for coupling a switching system to a remote control computer is disclosed therein.

Figure 1:
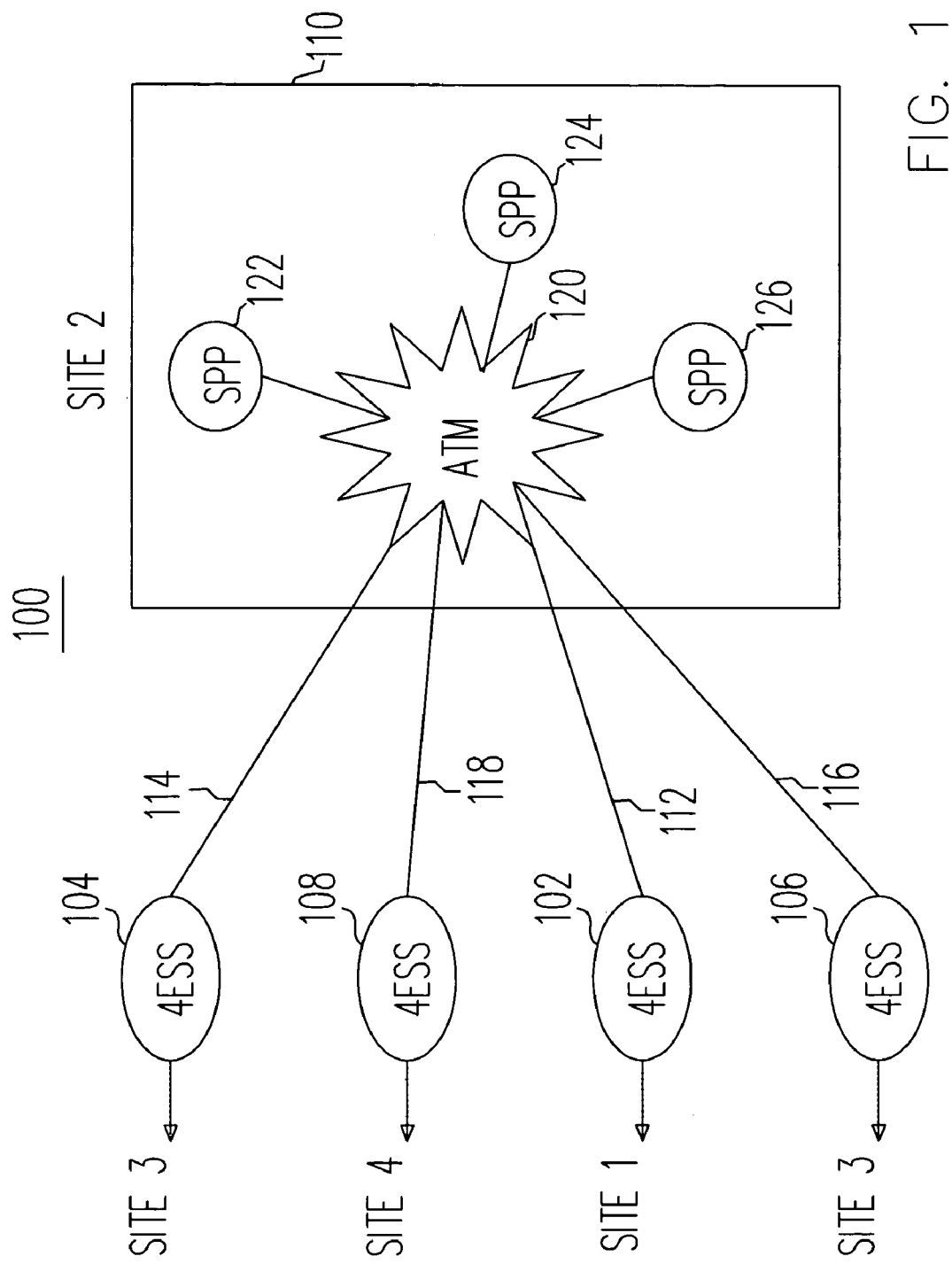
FIG. 1 shows a simplified block diagram of four switching systems controlled by a plurality of control computers remotely located from the switching systems.

FIG. 1 shows a simplified block diagram of a switching system control architecture 100 whereby computer control of multiple switching systems is provided by remotely located computers 122, 124, 126.

In FIG. 1, four (4) switching systems 102, 104, 106, 108 known as Lucent Technologies, Inc. No. 4 ESS™ switching systems are coupled to call processing and control computers 122, 124, 126 through data links 112, 114, 116, and 118. The data links 112, 114, 116 and 118 operatively couple control computers 122, 124, and 126 to the switching systems 102, 104, 106 and 108. In instances where other switching systems are used as switching systems 102, 104, 106 and 108, such as a Lucent Technologies No. 5 ESS™ a terminal adapter (not shown) might be required between the switching systems and an asynchronous transfer mode switching system 120 coupling the switching systems 102, 104, 106 and 108 to the control computers 122, 124, and 126.

Figure 2:
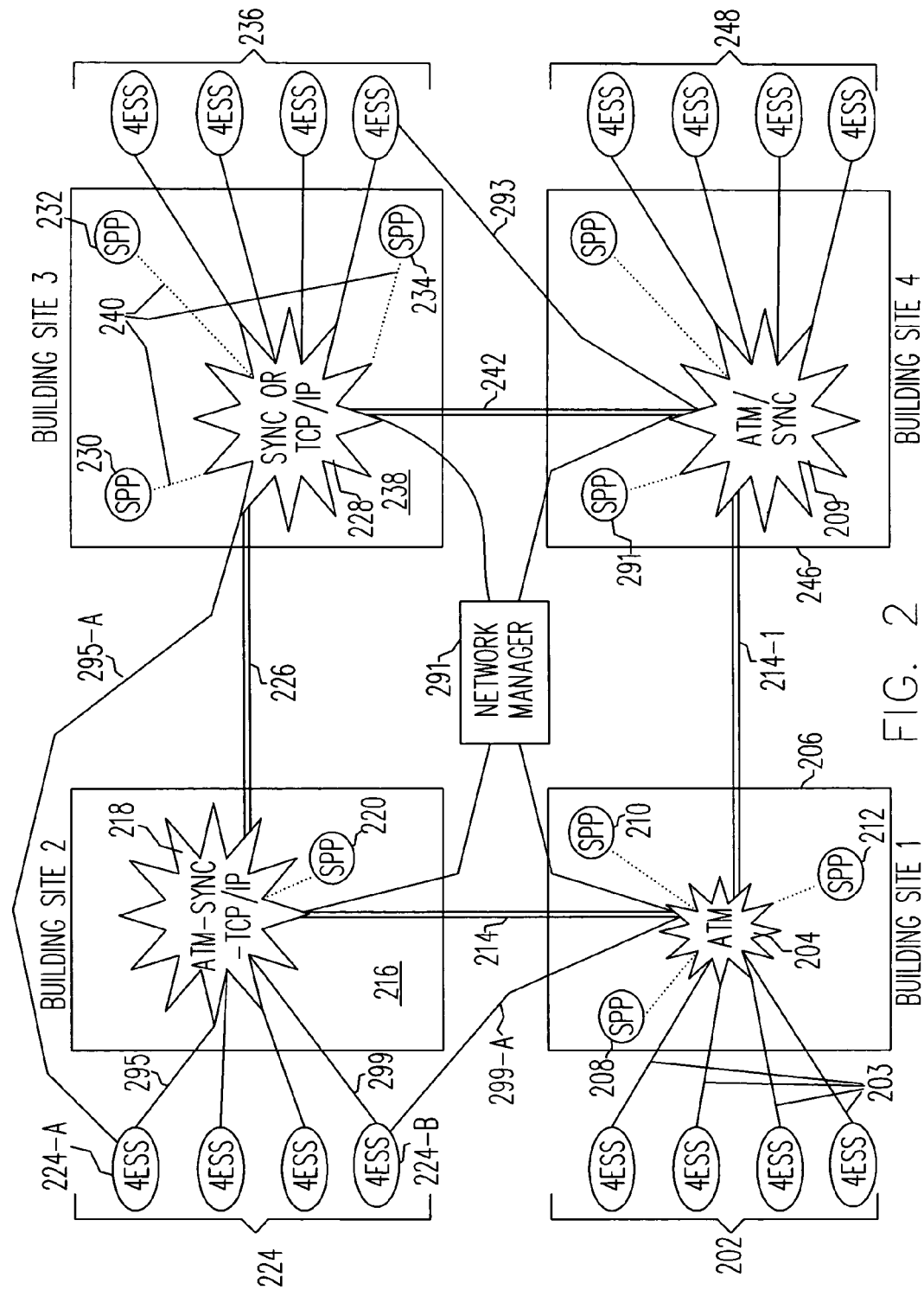
FIG. 2 shows a block diagram of centralized control architecture for a plurality of switching networks coupled to centrally located control computers.

In the preferred embodiment, the operative coupling between the switching systems 102, 104, 106 and 108 and the control computers 122, 124, 126 is accomplished using an asynchronous transfer mode (ATM) interface, well-known to those skilled of the telephony art. As set forth more fully below, and as shown in FIG. 2, other protocols might also be used as well. Synchronous data transfer or TCP/IP protocols could also be used. Call processing data that is normally exchanged between a co-located computer for each of the switching systems 102, 104, 106 and 108, is interfaced to the data links 112, 114, 116 and 118.

In a No. 4 ESS™ the 1B processor controlling the No. 4 ESS™ is coupled to switching system peripheral equipment through an interface bus, also known as the IFB. Call processing and control computers 122, 124, 126 communicate with the No. 4 ESS™ through data links 112, 114, 116, and 118 that are operatively coupled to the IFB. The 1B processor controlling the No. 4 ESS™ also communicates to peripheral equipment over the IFB. Call processing data is thereby available in a No. 4 ESS™ from the IFB and an appropriate electrical interface to that allows call-processing signals to be captured from the IFB.

In FIG. 1, data links 112, 114, 116 and 118 are high speed asynchronous transfer mode or ATM data links between the switching systems remotely located from a building site 2,110 wherein control computers 122, 124, 126 provide the control functions to the switching systems 102, 104, 106 and 108. In instances where the switching systems 102, 104, 106 and 108 consist of Lucent Technologies No. 4 ESS™ switching systems, an appropriate electrical interface to the IFB of the switching systems 102, 104, 106 and 108 would of course need to translate IFB signals to an asynchronous transfer mode. If switch 120 is a TCP/IP protocol switch (not shown) instead of ATM as shown, switches 102, 104, 106, 108 would require an appropriate TCP/IP protocol interface. In instances where the switching systems 102, 104, 106 and 108 are No. 4 ESS™ systems, the switching fabric interface (SFI) provides the appropriate interface.

Those skilled in the art will recognize that one or more of the ATM links 112, 114, 116, 118 between the switching systems and the control computers could just as easily be replaced with synchronous data links between the switching systems 102, 104, 106, and 108 and the control computers, such as a TCP/IP link protocol mentioned above. As shown in FIG. 1, an asynchronous transfer mode switch 120 is required to couple the ATM links 112, 114, 116, and 118 to the control computers 122, 124, 126. The ATM switch is programmed to accept asynchronous transfer mode cells and to route the cells between the switching systems 102, 104, 106, 106 and the control computers 122, 124, 126. ATM and ATM switching is well-known in the art.

One appropriate computer might handle the call processing computing for several switching systems, however, for purposes of system reliability, back up computers are typically employed to provide enhanced system reliability. In FIG. 1, computers 124, and 126 provide redundant, back-up computing to a control computer 122. The control system architecture described in U.S. patent application Ser. No. 08/808,298 filed Feb. 28, 1997 for a "Distributed Network Control and Fabric Application Interface" is incorporated by reference herein.

The physical media used for the data links 112, 114, 116 and 118 are preferably optical fiber, however a microwave link, coax cable, or even a twisted pair of wires, or XDSL (any digital subscriber link) could be used for the data links shown in FIG. 1. Those skilled in the art will recognize that any appropriate signaling protocol might be used over the asynchronous transfer mode (ATM) link.

In the apparatus depicted in FIG. 1, a single control computer provides the computational capabilities required for the call processing of several switching systems. By using a single remote computer, preferably backed up for enhanced system reliability, overall system reliability can be enhanced while reducing maintenance costs attributable to maintenance staff required for each switching systems 102, 104, 106 and 108.

FIG. 2 shows a network of centrally controlled switching systems as alternate embodiments of the architecture and a furtherance of the singular architecture disclosed in FIG. 1. In FIG. 2, in building site 1, 206 there is a first network of communication switching systems 202 under the control of remotely located control computers operatively coupled to such computers 208, 210, 212, (depicted as SPPs in FIG. 2) via an asynchronous transfer mode switch 204 and ATM data link 203. Call processing and control signals from the switching networks 202 is exchanged with the control computers 208, 210, 212, remotely located with respect to the switching system 202, via the ATM switch 204 and the ATM data links 203. The computers 208, 210, 212 provide call processing and control functions to the network of switching systems 202 by ATM communications between the switching systems 202 and the computers 208, 210, 212. In addition to using asynchronous transfer mode data transfer, so-called TCP/IP protocols might be used as well.

For network reliability, the switching systems being controlled have redundant control links to other building sites. In FIG. 2, a switching system 224-A has two links: a primary control link 295 to building site 2, 216 and an alternate link 295-A to another control site, building site 3. Similarly, switching system 224-B has a primary link 299 to building site 2 but an alternate link 299-A to building site 1, 206. Back-up link 293 couples a switching system 236 to the ATM/synchronous network 209 of building site 4, 246. In the event a building site is destroyed for example, back-up control sites established through such links using appropriate media significantly improve system reliability.

A network manager controller 291 monitors loading and usage of all of the ATM switching nodes 218, 228, 204, 209, communication links between the nodes (226 and 242 for example) and controlling computers (e.g., 220, 208, 210, 212, 232, 234) for the switches. The network manager 291 can reconfigure loading of the nodes, including if necessary, enlisting other controlling computers (e.g. 208) to efficiently manage loading throughout the network shown in FIG. 2.

Those skilled in the art will recognize that one computer, 208 for instance, of the computers 208, 210, 212 might provide supervision and control of all of the switching systems 202 remotely located with respect to the control computers 208, 210, 212. The other computers 210, 212 might provide fault tolerant redundant back-up to the computer 208 controlling the switching network. Alternatively, computers 208 and 210 could control switching systems 202 and control computer 212 could be used as a backup.

Alternate embodiments of the invention disclosed above and that are shown in FIG. 2 would include linking the ATM switch 204 to another ATM switch 218 at another central control site 216 for another network of communications switches 224 via another ATM data link 214. As shown, ATM switch 218 couples a single, remotely located call processing/control computer 220 for a second network of switches 224. The computers 208, 210, 212 of the first site 206 could provide back up control functionality for the single computer 220 of the second site 216 via the ATM data link 214. Similarly, using an appropriate data link 214-1, these computers 208, 210, 212, could provide back-up for the computer 291 controlling an ATM/synchronous switch 209 within a fourth building site, 246.

In the second site 216, the ATM switch 218 is captioned as an ATM-sync switch to show that ATM communications between the first control site 206 and the second control site 216 might be converted to a synchronous format by the ATM switch 218. In the second control site 216, located at building site 2, communications between the second network of switches 224 might be ATM format, however, communications between the switches of the network 224 and the control computer 220 might be synchronous as well. Depending upon the particular switches 224 being used, other electrical interfaces might be required to couple the switches 224 to remotely located control computers. Certain switches, such as Lucent Technologies No. 5 ESS used in place of the 4ESS, might require other electrical interfaces to couple them to remotely located control computers. Certain switches, such as Lucent Technologies No. 5 ESS™, might require a terminal adapter to couple the switch to an external control computer. Other switches with other control architectures might require other electrical interfaces.

Yet another alternate embodiment includes a synchronous communications link 226 operatively coupling the second control site 216 to a third control site 238. A synchronous switching system 228 within the third control site 238, which again is remotely located from a third set of communications systems 236, synchronously links the communications systems 236 to control computers 230, 232, 234 via an appropriate synchronous communication link 240. The computers 230, 232, 234 within the third control site 238 might also provide backup computer control capability to the previously described communication networks, 202, 224 via communications links described above.

A suitable synchronous communications link 242, operatively couples the aforementioned remote control computers for the communication system 202, 224, 236 to yet another remote site 246 where control and command of another communication network 248 is located.

Those skilled in the art know that the 1B processor used with the Lucent Technologies, Inc. No. 4ESS™ switch has spare ports on the IFB. These spare ports allow for system growth and provide access to the switching system for remote control computers.

What is claimed is:

1. In a telecommunications network, an apparatus for controlling a plurality of remote switching systems, comprising:
    a plurality of control computers in a least two processing sites for processing a plurality of calls being routed through said plurality of remote switching systems in which said switching systems are in a location other than the processing sites;
    a signaling network having a switching node in each of the processing sites for which the control computers exchange call processing data with said plurality of remote switching systems; and
    a central network manager operatively coupled to the plurality of control computers and the switching nodes in each processing site, the central network manager configured for managing and monitoring the call processing data being exchanged on the signaling network between the plurality of control computers and the plurality of remote switching systems so as to reconfigure loading of call processing data being exchanged on the signaling network.

2. The switching system of claim 1, wherein one processing site includes a first plurality of control computers and the other processing site includes a second plurality of control computers, the central network manager signals at least one of the computer computers in the first plurality of control computers to control the plurality of remote switching systems operatively coupled to the second plurality of control computers.

3. The switching system of claim 1, wherein at least one of said control computers is configured to control loading of call processing data on the signaling network responsive to a command from the central network manager.

4. The switching system of claim 3, wherein each of the switching nodes of the signaling network comprises at least a TCP/IP server for exchanging call processing data.

5. The switching system of claim 3, wherein at least one of the switching nodes comprising an multiple-protocol switch for converting call processing data between asynchronous transfer mode and synchronous transfer mode.

6. A method for controlling a plurality of remote switching systems, comprising:
    providing a plurality of control computers in a least two processing sites for processing a plurality of calls being routed through said plurality of remote switching systems in which said switching systems are in a location other than the processing sites;
    providing a signaling network having a switching node in each of the processing sites for which the control computers exchange call processing data with said plurality of remote switching systems; and
    providing a central network manager operatively coupled to the plurality of control computers, and the switching nodes in each processing site in which the central network manager manages and monitors the call processing data being exchanged on the signaling network between the plurality of control computers and the plurality of remote switching systems so as to reconfigure loading of call processing data being exchanged on the signaling network.

* * * * *